Patented Feb. 4, 1941

2,230,925

UNITED STATES PATENT OFFICE 2,230,925

PREPARATION OF 1,1,1-TRIFLUORO-2-CHLORO-ETHANE

Anthony Francis Benning, Woodstown, N. J., assignor to Kinetic Chemicals, Inc., Wilmington, Del., a corporation of Delaware No Drawing. Application March 23, 1939, Serial No. 263,675

10 Claims. (Cl. 260—653)

This invention relates to the production of 1:1:1-trifluoro-2-chloro-ethane, and more particularly, to the preparation of this compound by the fluorination of 1:1:1:2-tetrachloro-ethane. The compound $CF_3CH_2Cl$ was mentioned by Locke, Brode and Henne (J. Am. Chem. Soc. 56, 1727), and was prepared by Henne and Renoll (J. Am. Chem. Soc. 58, 888-9) as a by-product in the fluorination of $CHF_2CHCl_2$. Henne and Hubbard (J. Am. Chem. Soc. 58, 404–6) were not, however, able to prepare it from $CCl_3CH_2Cl$ using either antimony trifluoride or hydrogen fluoride as a source of fluorine in the presence of antimony pentachloride as a catalyst.

Contrary to the "stabilization" hypothesis proposed from the aforementioned work (J. Am. Chem. Soc. 58, 882), it has now been found that $CF_3CH_2Cl$ can be prepared from $CCl_3CH_2Cl$ by clean-cut reactions involving no important side reactions. This is not only contrary to what might be expected from the work described above, but in addition is the first instance where three fluorine atoms have been substituted on the same carbon atom when an adjacent carbon atom contained a substituted chlorine radical. The compound $CF_2ClCF_2Cl$ is now prepared on a commercial scale according to the process of United States Patent No. 2,005,708, but regardless of the starting compound (perchlorethylene or hexachlorethane) substitution follows a definite course in which two fluorine atoms go on one carbon atom and then two on the adjacent carbon atom. In view of this the present invention was all the more surprising.

This invention had for an object the provision of a process adaptable to commercial scale production of 1:1:1-trifluoro-2-chloro-ethane from 1:1:1:2-tetrachloro-ethane. A general advance in the art, and other objects which will appear hereinafter, are also contemplated.

It has now been found that unsymmetrical tetrachloroethane can be fluorinated directly with hydrogen fluoride in the presence of an antimony pentafluorochloride as a catalyst to produce 1:1:1-trifluoro-2-chloro-ethane in very high yields without the formation of undesirable side products.

From the following description, in which is disclosed certain embodiments of the invention, as well as details of what is believed to be the best mode for carrying out the invention, it will be apparent how the foregoing objects and related ends are accomplished. Quantities are given in parts by weight throughout the application.

Example I

A small autoclave of the sealed steel bomb type was charged with:

| | Parts |
|---|---|
| $CCl_3CH_2Cl$ | 50 |
| HF | 50 |
| $SbF_xCl_{5-x}$ (18% F) | 70 |

Essentially all of the antimony was in the pentavalent state. The autoclave was heated to 125° C. for four hours. A yield of about 80% of $CF_3CH_2Cl$ (B. P. 6.1° C.) was obtained.

Example II

A steel reactor equipped with suitable adits and exits was charged with:

| | Parts |
|---|---|
| $CCl_3CH_2Cl$ | 907 |
| $SbF_xCl_{5-x}$ (18% F) | 1090 |

Essentially all of the antimony was in the pentavalent state. The temperature of this starting charge was gradually raised to and maintained at about 125° C. for a continuous operation. The pressure of the system was about 100 to 125 pounds per square inch gauge. Agitation of the reaction mixture was maintained throughout the progress of the run. Provision was also made for the scrubbing of the effluent gases. Arrangements for condensation in suitable apparatus, and collection in appropriate receivers, were also provided. As soon as the temperature and pressure desired for the fluorination operation were reached, hydrogen fluoride gas was introduced at the rate of 15 to 17 parts per hour, and more of the organic material (unsymmetrical tetrachloroethane) added at the rate of 40 to 42 parts per hour. The take-off of the effluent gases amounted to about 28 to 30 parts per hour during the same period. The auxiliary apparatus (condensers, washers, scrubbers, etc.) is disclosed in detail in United States Patent Nos. 2,005,708 and 2,005,705, and a detailed description of the same is omitted here for the sake of brevity. Chlorine was added from time to time to maintain the desired pentavalent content of the catalyst. In this instance it was added separately, but in some apparatus set-ups it may more conveniently be added in conjunction with the organic material. The combined yield of organic fluorine compound boiling below 49° C. was approximately 90% over a period of ten hours. The yield of material ($CF_3CH_2Cl$) boiling at 6.1° C. was approximately 80%. The higher boiling compound had the formula $CF_2ClCH_2Cl$ and upon purification boiled at about 47.2° C. No evidence of chlorination of the hydrogen in the —$CH_2Cl$ radical (group) was found.

Example III

A steel autoclave was charged with:

| | Parts |
|---|---|
| $CCl_3CH_2Cl$ | 65 |
| HF (anhydrous) | 50 |
| Antimony chloro-fluoride | 15 |

Essentially all of the antimony was in the pentavalent state. The autoclave was heated in an oil bath at 125° C. for four hours. The recorded pressure was approximately 180 pounds per square inch gauge. Approximately 22 parts of $CF_3CH_2Cl$, which is a yield of about 47%, were obtained.

Example IV

An agitator equipped reactor of the type described in Example II was charged with:

| | Parts |
|---|---|
| $CCl_3CH_2Cl$ | 750 |
| Mixed antimony chloro-fluoride | 1020 |

The starting charge was heated gradually to raise the temperature to 160° C., at which level it was maintained during a continuous fluorination procedure. The pressure in the system was about 125 to about 160 pounds per square inch gauge. Essentially all of the antimony was in the pentavalent state. Agitation was carried out continuously. Hydrogen fluoride was added at the rate of 16 parts per hour, and unsymmetrical tetrachloroethane at the rate of 45 parts per hour. The effluent gases were washed, condensed and collected. The combined yield of organic fluorine compounds boiling below 49° C. was approximately 90% over a period of twelve hours.

The composition of the antimony halide used in effecting the fluorination may vary within relatively wide limits. Up to the present time no practical advantage has been found for antimony fluorochlorides having a fluorine content outside the range of 6% to 21%. This preferred range has given especially advantageous results.

In the preferred embodiments of the invention the pentavalent antimony content of the antimony halide is substantially 100%. This type of material seems to prevent side chain chlorination. The catalytic material may contain some trivalent antimony halide, but the amount of this should not be great. Less than 70% pentavalent material in the antimony halide has not been found to give desirable results, and a pentavalent catalyst diluted to more than this extent is neither recommended nor preferred.

Free halogen such as chlorine may be added from time to time to the catalyst to maintain the desired pentavalent halide content of the same. This overcomes any reduction of the trivalent state which is brought about by decomposition and the presence of oxidizable materials.

The exact mode of introducing the reactants into the action zone is subject to variation, as will be apparent from a study of the specific examples and the tenor of the specification. When the process is operated continuously the hydrogen fluoride and unsymmetrical tetrachloroethane may be added separately, in alteration, or simultaneously. Any of these types of addition may be made continuously or intermittently. In continuous operating procedures it is preferable to build up the optimum condition or conditions before starting the addition of the organic material. When the desired conditions obtain, the unsymmetrical tetrachloroethane, hydrogen fluoride and halogen are preferably fed continuously or intermittently at rates designed to produce 1:1:1-trifluoro-2-chloro-ethane without extensive changes in the composition of the antimony fluoro halide.

The hydrogen fluoride, halogen and unsymmetrical tetrachloroethane may be added in one stream. An example of this procedure involves the passage of hydrogen fluoride gas through the liquid 1:1:1:2-tetrachloro-ethane to produce a mixture of vapors which are subsequently introduced into the reactor.

Temperatures of fluorination may be varied widely. The formation of $CF_3CH_2Cl$ increases above about 95° C. Lower temperatures in general lead to the production of larger proportions of less highly fluorinated compounds. Satisfactory results have been obtained with temperatures as high as 200° C. Even higher temperatures, provided they do not cause uneconomical decomposition of the reactants and/or chlorination of the 1:1:1:2-tetrachloro-ethane, are satisfactory. Temperatures around 150° C. give the most desirable results in the production of the $CF_3CH_2Cl$ and are to be preferred, although it is realized that in some instances the higher temperatures may give entirely satisfactory results.

The pressure may also vary within relatively wide limits, but in general, and preferably, should be regulated to maintain the antimony halide in the liquid phase while allowing vaporization of the $CF_3CH_2Cl$ end product. Under some temperature conditions superatmospheric pressures of from 5 to 10 pounds per square inch gauge have been used with complete satisfaction. Generally speaking, at temperatures above 125° C. the preferred pressures employed are within the range of about 40 to about 200 pounds per square inch. There is no apparent reason why higher pressures could not be used satisfactorily, provided the necessary apparatus is available.

The reaction and separation or isolation of the products of distillation, fractionation or otherwise may be carried out simultaneously, or in separate steps. In the latter case it is not necessary that the pressure of the two steps be the same.

The material 1:1:1-trifluoro-2-chloro-ethane has many commercial scale uses. It is especially suitable as a refrigerant (see United States Reissue Patent 19,265). It may be employed as a solvent suspension medium or reaction medium in many fields of organic chemistry. It may also be employed as a source material for the $CF_3CH_2$— radical when such a radical is being introduced into an organic molecule by procedures simulating well-known alkylation reactions.

The ease with which 1:1:1-trifluoro-2-chloro-ethane is produced according to this invention is quite unexpected, and the fact that it could be produced at all from the source material employed here is contrary to what would be expected from the literature in the art. In addition to this, the process of the present invention possesses many advantages, among which are the fact that the method gives high yields with practically no side reactions. In the conditions described in the specification, the side reactions are always minimized, and in most cases entirely eliminated.

In résumé, it is to be noted that an entirely unobvious and unexpected result that could not be predicted by a knowledge of the behavior of other highly chlorinated ethanes in fluorination reactions, has been obtained. This is the first instance in which a CCl₃—group has been directly fluorinated to a CF₃—group when there was a halogen atom on an adjacent carbon atom.

As many apparently widely different embodiments of this invention may be made without departing from the spirit and scope thereof, it is to be understood that I do not limit myself to the specific embodiments thereof except as defined in the appended claims.

I claim:

1. In a process of preparing 1:1:1-trifluoro-2-chloro-ethane, the step which comprises contacting hydrogen fluoride and 1:1:1:2-tetrachloro-ethane in the presence of an antimony halide catalyst, and maintaining the pentavalent antimony halide content of the catalyst within the range of 70% to 100% of the antimony halide present until 1:1:1-trifluoro-2-chloro-ethane is produced.

2. The process of claim 1 when substantially 100% pentavalent antimony halide is maintained during the reaction.

3. The process of claim 1 in which the conditions are maintained until 47% of the 1:1:1-trifluoro-2-chloro-ethane is produced.

4. The process of claim 1 in which the conditions are maintained until 80% of the 1:1:1-trifluoro-2-chloro-ethane is produced.

5. The process of claim 1 when substantially 100% pentavalent antimony halide is maintained during the reaction, and in which the conditions are maintained until 80% of the 1:1:1-trifluoro-2-chloro-ethane is produced.

6. The process which comprises contacting hydrogen fluoride and 1:1:1:2-tetrachloro-ethane in the presence of an antimony halide catalyst comprising essentially 100% antimony pentachlorofluoride having a fluorine content of 6% to 21%, and maintaining the said contact in the presence of the antimony compound and maintaining the pentavalent state of the antimony compound until at least 80% of the 1:1:1:2-tetrachloro-ethane has been converted to a 1:1:1-trifluoro-2-chloro-ethane.

7. The process which comprises contacting hydrogen fluoride and 1:1:1:2-tetrachloro-ethane at temperatures above 95° C. in the presence of an antimony halide catalyst comprising essentially 100% antimony pentachlorofluoride having a fluorine content of 6% to 21%, and maintaining the said contact in the presence of the antimony compound and maintaining the pentavalent state of the antimony compound until an economic percentage of the 1:1:1:2-tetrachloro-ethane has been converted to 1:1:1-trifluoro-2-chloro-ethane.

8. The process which comprises contacting hydrogen fluoride and 1:1:1:2-tetrachloro-ethane at temperatures of 95° to 200° C. in the presence of an antimony halide catalyst comprising essentially 100% antimony pentachlorofluoride having a fluorine content of 6% to 21%, and maintaining the said contact in the presence of the antimony compound and maintaining the pentavalent state of the antimony compound until an economic percentage of the 1:1:1:2-tetrachloro-ethane has been converted to 1:1:1-trifluoro-2-chloro-ethane.

9. The process which comprises contacting hydrogen fluoride and 1:1:1:2-tetrachloro-ethane at temperatures of 95° to 200° C. and pressures above 5 pounds per square inch in the presence of an antimony halide catalyst comprising essentially 100% antimony pentachlorofluoride having a fluorine content of 6% to 21%, and maintaining the said contact in the presence of the antimony compound and maintaining the pentavalent state of the antimony compound until an economic percentage of the 1:1:1:2-tetrachloro-ethane has been converted to 1:1:1-trifluoro-2-chloro-ethane.

10. The process which comprises contacting hydrogen fluoride and 1:1:1:2-tetrachloro-ethane at temperatures of 95° to 200° C. and pressures of 40 to 200 pounds per square inch in the presence of an antimony halide catalyst comprising essentially 100% antimony pentachlorofluoride having a fluorine content of 6% to 21%, and maintaining the said contact in the presence of the antimony compound and maintaining the pentavalent state of the antimony compound until an economic percentage of the 1:1:1:2-tetrachloro-ethane has been converted to 1:1:1-trifluoro-2-chloro-ethane.

ANTHONY FRANCIS BENNING.